United States Patent
Allain et al.

(10) Patent No.: US 6,449,259 B1
(45) Date of Patent: Sep. 10, 2002

(54) COMMUNICATION CONTROLLER

(75) Inventors: Brian Jerry Allain, Freehold; Dennis W. Specht, Sparta; Edward Stanley Szurkowski, Maplewood, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/885,539

(22) Filed: Jun. 30, 1997

Related U.S. Application Data

(60) Provisional application No. 60/042,271, filed on Mar. 31, 1997.

(51) Int. Cl.[7] .......................... H04L 12/26; H04L 12/28
(52) U.S. Cl. ..................... 370/253; 370/351; 370/401; 370/238
(58) Field of Search ................. 370/252, 253, 370/242, 238, 236, 230, 231, 232, 465, 351, 353, 401; 340/827, 2.23; 379/114.02, 114.07, 356, 402

(56) References Cited

U.S. PATENT DOCUMENTS

| | | | | |
|---|---|---|---|---|
| 5,402,478 A | * | 3/1995 | Hluchyj et al. | 379/221 |
| 5,793,976 A | * | 8/1998 | Chen et al. | 370/351 |
| 5,892,754 A | * | 4/1999 | Kompella et al. | 370/236 |
| 5,898,668 A | * | 4/1999 | Shaffer | 370/252 |
| 5,898,673 A | * | 4/1999 | Riggan et al. | 370/237 |
| 5,933,425 A | * | 8/1999 | Iwata | 370/252 |
| 6,064,653 A | * | 5/2000 | Farris | 370/237 |

FOREIGN PATENT DOCUMENTS

WO        WO97/28628        * 8/1997

OTHER PUBLICATIONS

Patent No. 5,563,875, filed on Jul. 10, 1995 and issurd on Oct. 8, 1996 to T.R. Hefel; L.T. Huynh; and P. McSweeney. Class: 370/15.
Application No. 02262659, filed on Sep. 28, 19990, by Asano Koichi. Class: H04L 12/48.
Application No. 05057089, filed Mar. 17, 1993, by Shiroshita Teruji, Class: H04L 29/10.
XP–002067511, "QOS Driven Routing In Packet Switched Networks of Multiple Transmition Media" by C. Tamvaclis. the Netherlands. pp. 2.1–2.8 Oct. 7, 1993.
XP–000582658, "Remote Sites: In from the Cold", by K. Taylor. Data Communications, Apr. 1996, p. 40–42.

* cited by examiner

*Primary Examiner*—Huy D. Vu
*Assistant Examiner*—Steven Nguyen

(57) ABSTRACT

The present invention provides a communication controller interfaced to a plurality of networks. The communication controller is able to monitor and measure the network characteristics of all the networks and route information signals that are part of established communications between users of a network to another network based on criteria set by the users or the network system provider. The routing is done without any disruption of the established communications.

10 Claims, 2 Drawing Sheets

COMMUNICATION CONTROLLER

CROSS REFERENCE TO RELATED APPLICATION

This application claims benefit of U.S. Provisional Application No. 60/042271, filed Mar. 31, 1997.

FILED OF THE INVENTION

The present invention is directed to the interconnection of different communication networks and more particularly to a device and method for routing information signals between the networks.

DESCRIPTION OF THE RELATED ART

A communication network is the interconnection of communicating devices (e.g., telephones, computers, modems, video transceivers) by way of communication channels so that information signals are conveyed between the communicating devices. The communication channels can be different types of media through which the information signals are conveyed. Communication channels can be implemented for example as metallic wires, coaxial cables, fiber optic cables, and open air (for wireless systems). The communicating devices are any device which can transmit and/or receive information signals.

During the past several years, there has been a tremendous increase in the use of communication networks known as data networks. One particular well known and popular data network is commonly referred to as the Internet. A data network is a communication network in which information signals are conveyed throughout the network in digital form. That is, digital bits representing some type of information (e.g., digital data, digitized voice, digitized video, facsimile data) are grouped together along with other bits of data, known as header bits or trailer bits, which represent information about data being transmitted and/or the particular communication protocol being employed by the network. Each group of bits is commonly referred to as a packet. Each packet is typically part of or associated with an information signal. The information signal can be data, voice, or video communication signals.

The protocol represents a particular set of rules by which all or some of the communicating devices within a data network (and other types of communication networks) initiate communication, convey information and terminate communication. Thus, all or some of the communicating devices (e.g., computers, modems, facsimile machines and other digital communication devices) which are part of a data network should transmit and receive information in accordance with a protocol. Typically, protocols are established communication standards that are well defined and followed by data networks. For example, the established protocols for the Internet are the well known IP protocol suite and associated upper level protocols (e.g., TCP/IP, UDP) which are followed by all users of the Internet.

The packets are routed throughout the network via a well known scheme commonly referred to as packet switching. In a packet switching data network, each packet is routed from point to point within the data network. The path taken by one packet representing part of an information signal can be different from the path taken by other packets of that same information signal. In essence, a network routing scheme or algorithm dictates the path to be taken by a packet at each point of the network until that packet arrives at its destination point. Some of the header bits or trailer bits contained within a packet are typically used to encode information about the origin, destination, and the order of the packet in relation to other packets. Also, the routing algorithm used by communicating devices throughout the network allows packets associated with a particular information signal to arrive at their proper destination. Packet switching networks are generally viewed as efficient networks for many types of communications when compared to other communication networks that do not use packet switching. One of the main reasons for this general view is due to the ability of packet switching networks to better able to recover from faults such as system equipment failure and communication link failures.

Prior to the advent of packet switching networks, many communication networks used a different scheme known as circuit switching. In contrast to packet switching, circuit switching allocates network resources to define a specific communication path or channel through which information is to be conveyed between two points within that network. Circuit switching is widely employed in the design of telephony systems such as the well known POTS (Plain Old Telephone System) networks or the PSTN (Public Switched Telephone Network) in which a particular communication path, or channel or circuit is allocated specifically for particular users who wish to communicate with each other. For example, in the case of a PSTN communication network, party A wishes to call party B via a telephone interfaced to the PSTN communication network. Party A dials party B's number. The dialed number, which is part of the signaling used by the PSTN protocol to initiate communication between a calling party and a called party, is recognized by the network and causes the network to establish a communication path between party A and party B. This particular communication path is used by Party A and Party B until the call is terminated by one of the parties. The information signals (a continuous stream of digitized voice samples) are conveyed over the same communication path until one of the parties terminates the telephone conversation. Circuit switched networks, such as the PSTN, are generally viewed as inefficient relative to packet switching networks particularly for sporadic or bursty communications because of the manner in which circuit switching networks allocate their resources.

Circuit switched communication networks are typically associated with telephony networks. Current telephony networks are typically digital versions of earlier telephony systems that used electro-mechanical switching to route analog voice signals between users of such systems. Thus, infrastructures of circuit switched communication systems (mostly telephony systems) throughout the world were firmly established even before the advent of digital communications. With the coming of digital communications, many of these networks now transmit their information signals in digital form but still continue to use circuit switching.

Packet switching networks and circuit switching networks are incompatible in that they use different protocols. Users of packet switched communication networks cannot communicate with users of circuit switched networks. Wholesale conversion of circuit switched communication networks to packet switched communication networks is very unlikely because of the costs involved. There wilt, therefore, be an extended period of time during which both types of networks will coexist. In many circumstances, there may be a need for users of circuit switched networks to communicate with users of packet switched networks. There is also a need for users of incompatible packet switched networks to communicate with each other because not all packet switched networks use the same protocol. More importantly, it is desirable for users of circuit switched communication networks to use the resources of a packet switched network. That is, the circuit switched user would actually transmit and receive information signals via a packet switched network. This is desirable because in many such instances a circuit switched user would actually be using a more efficient and less costly network to communicate with another circuit switched user. A particular type of communication system known as Packet Telephony applies this very philosophy. Packet Telephony is the integration of speech compression and data networking technologies to provide traditional and enhanced telephony services (e.g., voice calls, FAX, voice mail,) over packet switched networks rather than the Public Switched Telephone Network (PSTN). For example, if two users of the PSTN (Person A and Person B) are having a telephone conversation, the analog speech signals from A's microphone are digitized by an A/D converter, typically at 8000 samples/second, 8 bits/sample, totaling 64 Kbits/sec. These digital speech samples are then compressed to reduce the number of bits needed to represent them. The compression ratio is typically in the range of 8:1 to 10:1 yielding a bit rate in the range of 6400 bits/sec to 8000 bits/sec. The compressor's output is then formed into packets, protocol header bits and trailer bits are added and the packets are transmitted through a packet switched network to the packet telephony system serving Person B. When the packets are received by Person B's system, the protocol header bits and trailer bits are removed and the compressed speech data is sent to a decompressor. The decompressor output is connected to a D/A converter which drives Person B's speaker. For a typical 2-party call, the packet telephony systems at each end simultaneously implement both the transmit and receive functions. The A/D (analog to digital converter), D/A (digital to analog converter), compressor, decompressor are well known electronic circuits used by those of ordinary skill in the art of electronics or electrical engineering. Thus, packet telephony is an example of a circuit switched network (e.g., the PSTN) interacting with a packet switching network.

The interaction of packet and circuit switched networks or the interaction between incompatible packet switched networks requires devices called gateways that provide cross conversions of voice, data, video signals and protocol information between the two types of communication networks. The gateway is able to understand the protocol used by the different communication networks and thus acts as a translator for the networks. Gateways enable communication to be established between otherwise incompatible networks. For example, gateways allow phones or other devices on the PSTN (a circuit switched network) to communicate with telephony devices connected to data networks. For Packet Telephony systems, gateways allow, for example, long distance telephone calls originating and terminating on the PSTN to be carried over packet switched data networks at a reduced cost. In essence, a gateway is a communications device which interconnects two or more incompatible communication networks and enables users of any of the networks to communicate with other network or use the resources of other networks. Service providers, which are entities such as local telephone companies, and commercial long distance carriers typically own the gateways and control a user's access to communication networks via these gateways.

Because of the manner in which packets of information are routed in packet switched networks, the quality of service (QoS) of any established communication that uses the resources of a packet switched network will vary. The term 'established communication' as used herein is defined as the process of at least two users (of the same or different networks) initiating communication with each other in accordance with their respective protocols and the users conveying information to each other over a communication network. The quality of service (QoS) of the 'established communication' is a performance level criterion that sets the conditions under which an 'established communication' is deemed unacceptable due to deteriorating conditions of the communication network through which information signals are being conveyed.

Specifically, the quality of service is a function of well known network characteristics such as bit error rate, packet error rate, packet loss rate, data jitter or delay variation and other factors that deteriorate the quality of established communication between users. Many times the quality of the established communication deteriorates to an unacceptable level resulting in loss of data or unintelligible voice signals in the case of packet telephony systems. However, the deterioration may be temporary as the quality of the established communication may once again become acceptable. The QoS parameters and acceptable values can be defined by either the users or the service provider or any other entity associated with the use, maintenance, or design of the communication equipment.

The variation in the quality of the 'established communication' for the packet switched networks (particularly for public data networks such as the Internet) is unpredictable and many of these networks offer no quality of service guarantees. It would, therefore, be desirable for users to have access to various networks and use those networks in a judicious manner such that when a network's quality of service deteriorates to an unacceptable level, an 'established communication' can be rerouted to a network that has an acceptable quality of service. It is further desirable that the rerouting be done without any disruption to the 'established communication' as any disruption will result in additional loss of data. A disruption is defined as any interruption of transmission and or reception of information signals resulting in loss of data or unintelligible voice, video or other signals.

Thus, there exists the need to have a system and method for interconnecting incompatible communication networks to each other such that the quality of service of the interconnected networks, including the network through which an established communication is conveyed, can be monitored. Also, there exists the need to measure the quality of service for each of the interconnected networks and develop a criteria for categorizing the measured quality of service as being acceptable or unacceptable.

SUMMARY OF THE INVENTION

The present invention provides a communication controller for routing information signals between a plurality of communication networks. The communication controller has the ability to monitor and measure the quality of service of the networks and also contains criteria that define acceptable quality of service for the networks. When the quality of service of a communication network through which the information signals are being routed has deteriorated to an unacceptable level, the communication controller reroutes the information signals through another of the plurality of communication networks whose quality of service is acceptable.

The communication controller comprises a Network Port configured to receive control signals based on quality of service network characteristic measurement data and network criteria data received by the communication controller, the Network Port is further configured to receive information signals from the plurality of networks and route the information signals in accordance with the control signals.

DETAILED DESCRIPTION

Figure 1:
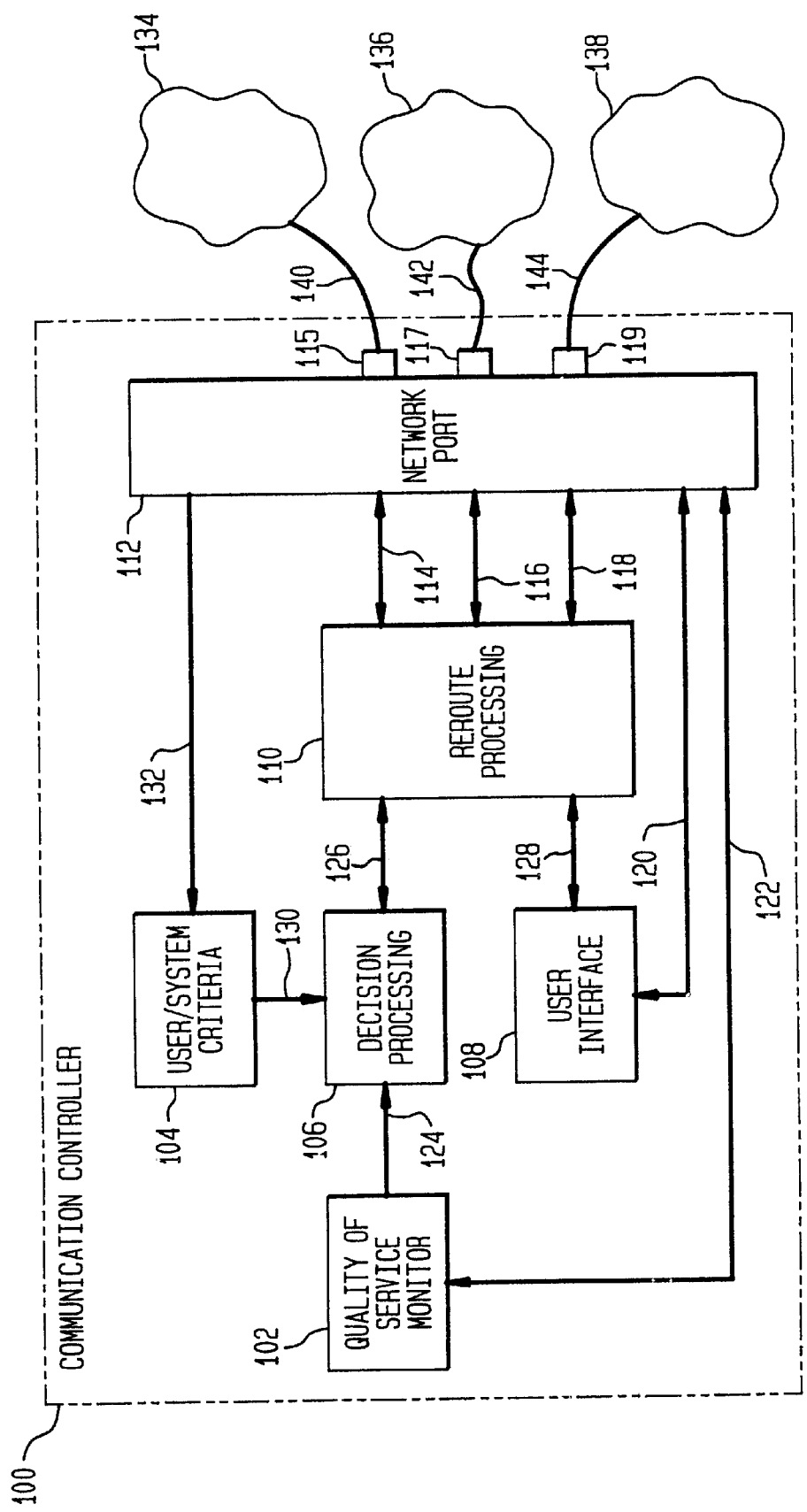
FIG. 1 depicts the present invention.

Referring to FIG. 1, there is shown the architecture of communication controller 100 interfaced to a plurality of communication networks 134, 136 and 138. Communication controller 100 receives information signals from the networks via communication links 140, 142 and 144 and thus is able to monitor the quality of service (QoS) of the networks. The information signals, which can be part of established communications between users of the networks, are routed to a different network by communication controller 100 without any disruption to the established communications when the quality of service of the network through which the information signals are currently being routed has deteriorated to an unacceptable level.

Communication controller 100, comprises QoS monitor module 102 which is connected to Decision processing module 106 via connecting path 124 and is also connected to Network Port 112 via connecting path 122. Communication controller 100 further comprises User/System Criteria module 104 which is connected to Decision Processing module 106 via connecting path 130 and is also connected to Network Port 112 via connecting path 132.

QoS monitor module 102 is configured to receive information signals via Network Port 112 and connecting path 122. Network Port 112 detects information signals destined for QoS monitor module 102 by inspecting the destination address of the incoming information signals. The destination address of an information signal is typically part of data stored in the protocol portion of information signals. QoS monitor module 102 can be given (by system providers) a unique address and thus information signals received by Network Port 112 which contain this unique address will be transferred to QoS monitor module 102. Network Port 112 is not limited to detecting information signals destined for QoS monitor module 102 in the manner described above; Network Port 112 can use other methods typically used for detecting information signals.

The information signals received by QoS monitor module 102 are defined as monitor signals which contain measurement data on the quality of service of the networks. The monitor signals are simply information signals that contain quality of service network characteristic data measured by monitoring equipment (not shown) in the networks. The quality of service network characteristic measurement data represent such network characteristics as bit error rate, packet error rate and data jitter. Typically, communication networks have various monitoring equipment (not shown) that measure these network characteristics and make this data available to other equipment of the networks such as gateways.

QoS monitor module 102 also has the capability to measure network characteristics by transmitting test signals through connecting path 122 and onto the various networks (134, 136 and 138) via Network Port 112 and communication links 140, 142 and 144. The test signals are information signals from which quality of service network characteristic measurement data are derived by QoS monitor module 102 through the use of well known data measurement techniques. The derived quality of service network characteristic measurement data represent the quality of service for the particular network through which the test signals were routed. The test signals are ultimately received by QoS monitor module 102. QoS monitor module 102 can determine, for example, network propagation delay with the use of test signals by simply measuring the amount of time it takes a test signals to propagate through a network and return to controller 100. Other network characteristics (e.g., bit error rate, packet error rate) can be measured with the use of similar well known signal measurement techniques.

QoS monitor module 102 includes the proper protocol information in the transmitted test signals such that these signals are recognized and processed by the network which is being measured and monitored. For example, if a packet switched network is being measured, QoS monitor module 102 would include the proper header and/or trailer bits in each packet associated with a test signal. The test signals destined for a particular network are properly routed to the data I/O point that corresponds to that network by Network Port 112. Network Port 112 routes the test signals to the proper data I/O point by detecting the address of the test signals. QoS monitor module 102 can include an address in protocol portion of the test signal that corresponds to the network that is to be monitored and measured. QoS monitor module 102 can measure characteristics of some or all the networks on a continuous basis, on a periodic basis or on an aperiodic basis. The time, manner and the particular networks measured and monitored by QoS monitor module 102 is decided by the service provider who has the option to change or alter how QoS monitor module 102 is used.

It should be noted that the quality of service network characteristic measurement data need not be transmitted as separate information signals. These data and other types of data can be embedded in the protocol portion of information signals. The service providers for each network can reserve specific locations within the protocol portion of their information signals for placement of quality of service network characteristic measurement data and other types of data destined for controller 100. Network Port 112 would then retrieve the data from the protocol portion of incoming information signals and transfer the data to QoS monitor module 102 via connecting path 122.

QoS monitor module 102 organizes and compiles the received quality of service network characteristic measurement data. The measurements derived and/or received by QoS monitor module 102 are compiled and organized by said module in a manner that is understandable to Decision Processing module 106. QoS monitor module 102 can compile the network characteristic measurement data in any manner suitable to requirements established by the service providers and/or users. For example, QoS monitor module 102 can group all data associated with network 134 together and do the same for networks 136 and 138. The compiled and organized QoS measurement data is transferred to Decision Processing module 106 by way of connecting path 124.

Communication controller 100 is also configured to receive information signals defined as criteria signals. Network Port 112 transfers the received criteria signals to User/System Criteria module 104 via connecting path 132.

As with QoS monitor module 102, User/System Criteria module 104 can be assigned a unique address. This address can be stored in the protocol portion of the criteria signals allowing Network Port 112 to detect such signals. The criteria signals contain network criteria data which can be established by the users and/or the service providers. That is, users can have the ability to set or establish the particular criteria under which they want to communicate with each other. Users having the capability to establish criteria can transmit criteria signals over the communication links to communication controller 100. The service provider may charge an extra fee to users with such capabilities; this is a billing policy issue that is to be decided by the service provider.

The established criteria may, for example, require that the bit error rate be less than 10 percent averaged over any one second interval, a packet loss rate of one packet for every 10,000 packets transmitted and a propagation delay of no more than 25 msec for any packet. The network criteria data can be stored in User/System Criteria module 104. The network criteria data stored in User/System Criteria module 104 can be modified, altered or completely changed by the system provider or by users who have been given such capabilities. As with the quality of service network characteristic measurement data, the network criteria data can be embedded in the protocol portion of information signals thus eliminating the need for having signals known as criteria signals. The service providers of the attached networks can reserve specific locations within the protocol portion of information signals for placement of network criteria data. Network Port 112 can retrieve the network criteria data from received information signals and transfer the network criteria data to User/System Criteria module 104 via connecting path 132. The network criteria data is accessible to Decision Processing module 106 by way of connecting path 130.

Still referring to FIG. 1, Decision Processing module 106 generates a decision message based on the quality of service network characteristic measurement data and the network criteria data received by QoS monitor module 102 and User/System Criteria module 104 respectively. Decision Processing module 106 transmits the decision message to Reroute Processing module 110 via connecting path 126. The decision message instructs Reroute Processing module 110 to either reroute information signals through a network that is different from the network currently being used by the information signals or maintain usage of the current network. Decision Processing module 106 determines which of the available networks satisfies the network criteria data (i.e., networks having an acceptable quality of service) and contains a list of such networks. Decision Processing module 106 maintains and updates this list on a continuous basis, on a continual basis, on a periodic basis or aperiodic basis, based on compiled quality of service network characteristic measurement information received from QoS monitor module 102 and the network criteria data received by User/System Criteria module 104. Decision Processing module 106 informs (by sending a message via connecting path 126) Reroute processing module 110 which network to use. Thus, there may be more than one available network that satisfy the criteria set by User/System criteria module 104. In such an instance, Decision Processing module 106 may use additional criteria that are based on cost or other parameters (e.g., time of day) to choose one of the available networks. The complexity of the particular methodology used by Decision Processing module 106 to derive its decision message depends on the particular design of the module. Decision Processing module 106 can do simple comparisons and/or computations involving multiple criteria and measured parameters to derive its decision message.

Reroute Processing module 110 in turn generates control signals—based on the decision message—onto connecting paths 114, 116, and 118 to instruct Network Port 112 as to the routing of information signals (e.g. packets, streams of bits) arriving at data Input/Output (I/O) points 115, 117 and 119 via communication links 140, 142 and 144. Control signals on connecting path 114 dictate how information signals arriving at data I/O point 115 via communication link 140 are to be routed by Network Port 112. Similarly, information signals arriving at data I/O points 117 and 119 through communication links 142 and 144 respectively are routed by Network Port 112 in accordance with the control signals on connecting paths 116 and 118. Data I/O points 115, 117 and 119 can be, for example, actual physical locations on Network Port 112 where the incoming information signals from the various networks terminate. These data I/O points can also be multi-wire connectors, optical connectors or any other connecting point typically used to terminate electrical, electronic or optical signals. The routed information signals are conveyed through the corresponding communication links to the corresponding network. The communication links can be high capacity T1 lines, fiber optic cables, coaxial cables or any other high capacity communication link.

The decision to route information signals to another network may additionally be based on information signals defined as user response signals. The user response signals are information signals that contain user response data. After receiving a decision message from Decision Processing module 106, Reroute processing module 110 sends a request message via connecting path 128 to User Interface module 108. User Interface module 108 generates an information signal containing the request message with proper protocol information attached and such a signal is sent to Network Port 112 via connecting path 120. Network Port 112 routes the signal to the proper data I/O point based on its destination address. The request message can be a signal to the user asking the user to make a decision on whether to route received information signals to another network. As with the criteria data and the quality of service measurement data, Network Port 112 has the capability to insert the request message within the protocol portion of an information signal destined for the queried user. The specific location wherein the request message is inserted is determined by the service provider. The request message provides the queried user with an opportunity to make a decision on whether to route to a different network or not. For example, for voice communications, the user can be advised by the use of short bursts of beeping tones that is heard by the queried user while the call is in progress. Presumably the queried user is aware of this feature and therefore knows how to respond to a route request.

Controller 100 is designed such that users can signify their decision to route to a different network without any additional equipment. Thus, in the case of voice communications, the user can simply push a designated button on the telephone's touch keypad to indicate to controller 100 to either reroute to a different network or not. The user's response, i.e., a user response signal, is received by Network port 112 which transfers it to User Interface module 108 via connecting path 120. User Interface module 108 is assigned a unique address. Network Port 112 is thus able to detect information signals destined for User Interface module 108, i.e., user response signals, by detecting the address of such signals. User Interface module 108 then generates a user response message based on the user response received from the queried user and sends that message to Reroute Processing module 110 via connecting path 128. If the user wishes to reroute to a different network, Reroute Processing module 110 generates control signals instructing Network Port 112 to route information signals in accordance with the decision message it received from Decision Processing module 106.

In order to achieve the routing of information signals from one data I/O point to another, Network Port 112 can be implemented as an analog switch activated by control signals, an electromechanical switch activated by control signals, a digital multiplexer or demultiplexer or any other type of electrical, electronic or optical circuitry that routes electrical or optical signals from one data I/O point to another data I/O point based on control signals. Further, Network Port 112 has additional circuitry that allows it to detect information signals as either monitor signals, criteria signals or user response signals. This additional circuitry can be implemented as a temporary buffer, a RAM (random access memory) with a lookup table containing addresses or other circuits that detect information signals and retrieve data from the detected information signals.

It should be noted that the received information signals have the proper protocol information appended to them by the time they are received by Network Port 112; typically, the appending of protocol information to information signals is performed by the gateways of the networks. Network Port 112 then simply routes these information signals in accordance with the control signals generated by Reroute Processing module 110.

As an example, suppose network 134 is a PSTN system and users of network 134 want to use the resources of network 136, a packet switched network such as the Internet. That is, information signals originating from network 134 also terminate in network 134 but they are routed as packets through network 136 by communication controller 100. Typically, information signals originating from a circuit switched network that are to be routed through a packet switched network are converted to packets by the gateway of the circuit switched network before they are transmitted to the packet switched network. Communication network 136 is continuously being monitored by communication controller 100.

Continuing with our example, if at some point during an established communication it is determined by Decision Processing module 106 that the quality of service of network 136 does not meet the criteria received by User/System Criteria module 104, Decision Processing module 106 sends a message to Reroute Processing module 110 to route the packets originating from communication network 134 through communication network 138 instead of communication network 136. This is assuming, of course, that Decision Processing module 106 has determined that the quality of service of network 138 meets the criteria received by User/System Criteria module 104. In our example, network 138 is another packet switched network. At this point, the users of network 134 are using the resources of network 138. The rerouting through a different network can be done automatically with the final decision being made by communication controller 100. Whether or not the rerouting is done automatically, if the information signals being routed are part of an established communication, the rerouting is done substantially without any disruption to the established communication. In the case of data communications, substantially no data or packets are lost as a result of the rerouting. In the case of voice and video signals, there are substantially no discernible disruptions to these signals.

However, the controller may give users of the network the option to make the decision to reroute the packets to another network. The user can choose not to reroute to a different network because there may be an added cost associated with rerouting a call to a different network. However, some providers may decide not to charge an extra fee for the user controlled routing feature. This is another billing policy issue to be decided by the service provider.

In our example above, Reroute Processing module 110 would generate control signals onto connecting path 114 to cause information signals arriving at data I/O point 115 to be routed to data I/O point 119 (information signals are now routed through network 138). Also, Reroute Processing module would generate control signals onto connecting path 118 to cause information signals destined for w network 134 and arriving at data I/O point 119 from network 138 to be routed to data I/O point 115.

After the information signals have been rerouted to network 138, the controller continues to monitor all networks including network 136. It may be at some later time, network 136 meets the criteria set by User/System Criteria module 104. Communication controller 100 can again route packets through network 136 if, for example, network 136 is less costly to use than network 138. This is another issue that may be decided by cost as some networks are relatively inexpensive to use. In particular, Decision Processing module 106 can perform an algorithm which enables it to route information signals from network 134 to network 136 and reroute through network 138 only when absolutely necessary. Further, after the rerouting through network 138 has occurred, Decision Processing module 106 will again route the information signals through network 136 as soon as that network again meets the criteria set by User/System criteria module 104.

Still continuing with our example, the packets of PSTN network 134 having been routed through Internet network 136, rerouted through another packet switched network 138, can be further routed through their own PSTN network 134. In such a case, the packets originating from network 134 via communication link 140 are simply transmitted back through communication link 140 by Network Port 112. This can occur if Decision Processing Module 106 has decided based on network criteria data in User/System Criteria module 104 and quality of service network characteristic measurement data that network 134 is the only network that has an acceptable quality of service. Decision Processing module 106 can also arrive at this decision based on additional criteria defined by the service provider. It may be for example that for network 134, which is a PSTN, the preferable backup network is the PSTN not another packet switched data network.

Summarizing our example, a circuit switched network, such as the PSTN, can use the resources of a packet switched network and have its information signals routed through other packet switched networks when necessary or use its own network resources, i.e., route its information signals through its own network, when the need arises. The circuit switched network can perform this type of judicious routing by using the device of the present invention, i.e., communication controller 100.

Modules 102, 104, 106, 108 and 110 of communication controller 100 can be implemented with digital logic circuitry well known in the art of electrical engineering and electronic circuit design. The connecting paths 124, 128 120, 122, 132, 114, 116, 118, 130 and 126 can be wires, or other well known implementations of connecting paths used in digital electronic circuits. The modules can also be implemented as firmware or software residing in memory circuits that are part of a microprocessor based system. In such a case, connecting paths 124, 130 and 128 are symbolic connections or virtual connections between the modules implemented as firmware or software subroutines. Depending on the particular implementations of the modules, the messages conveyed between the modules can be represented as digital signals, analog signals, optical signals, contents or memory locations in a memory circuits, contents of a register that is part of a firmware or software program. It should be noted that although controller 100 is shown interfaced to three communication networks, it should be obvious to one of ordinary skill in the art to which this invention pertains that the number of communication networks interfaced to the controller is not limited to any particular number. Further, the example given above does not limit networks 134, 136 and 138 to any particular type of network. Communications networks 134, 136 and 138 can be any type of communication networks that can be connected to other communication networks via a gateway.

Figure 2:
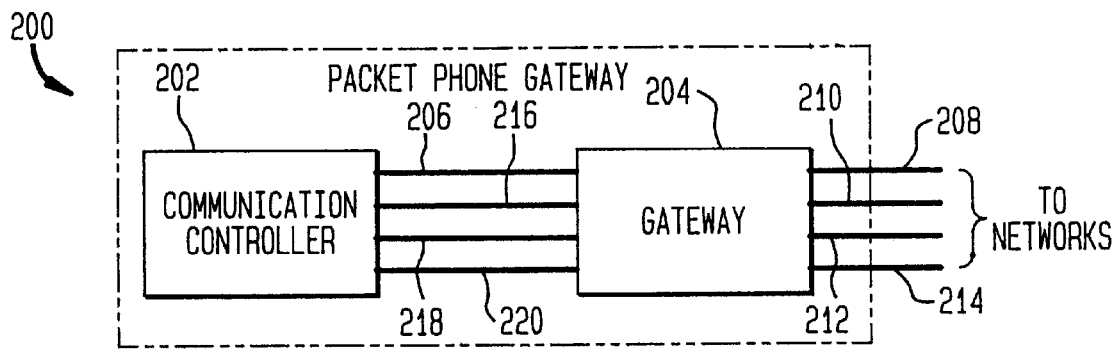
FIG. 2 shows the present invention interfaced to a gateway.

The communication controller of the present invention can also be interfaced directly to communication devices or system such as gateways, mainframe computers or personal computers. FIG. 2 shows a communication controller 202 interfaced to a gateway 204 by way of controller ports 206, 216, 218 and 220. Gateway ports 208, 210, 212 and 214 are connected to various networks (not shown). Information signals appearing at the gateway ports (208, 210, 212 and 214) are processed by gateway 204 and are then transferred to communication controller 202 via the controller ports (206, 216, 218, and 220) for proper routing. Communication controller 202 performs the routing and places the information signals at their proper ports to be transferred to gateway ports (208 210, 212 and 214) by gateway 204. That is, after the routing is performed by communication controller 202, information signals appearing on controller port 206 from communication controller 202 is transferred to gateway port 208. Controller ports 216, 218 and 220 have a similar relationship with gateway ports 210 212 and 214 respectively.

As an example, suppose based on system characteristics, information signals at gateway port 208 is to be routed to gateway port 210. The information signals arriving at gateway port 208 are first processed by gateway 204 and then transferred to controller port 206. Communication controller 202 then routes the signals to controller port 216 which are then transferred to gateway port 210 by gateway 204.

Although gateway 204 and communication controller 202 are shown as separate entities, it is obvious to one of ordinary skill in the art to which this invention belongs that communication controller 202 can be integrated within the circuitry and system of gateway 204. Thus, the combination of gateway 204 with communication controller 202 is referred to as Packet Phone Gateway (PPG) 200.

Figure 3:
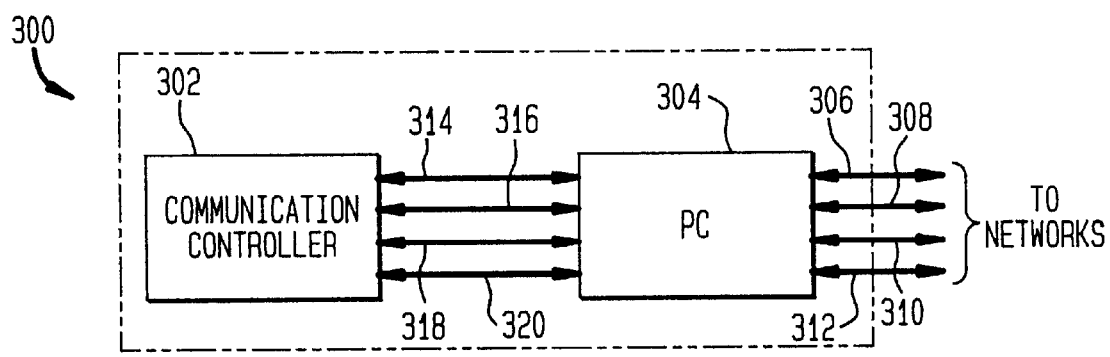
FIG. 3 shows the present invention interfaced to a personal computer.

FIG. 3 shows a communication controller 302 interfaced to a personal computer (PC) 304 by way of controller ports 314, 316, 318 and 320. PC ports 306, 308, 310 and 312 are connected to various networks (not shown). Information signals appearing at the PC ports (306, 308, 310 and 312) are processed by protocol software residing in PC 304. There are many such commercial software packages currently available. Information signals to be transmitted by PC 304 are sent to communication controller 302 via controller ports 314, 316, 318 and 320 for proper routing. Communication controller 302 can be integrated within the circuitry, firmware and/or software of a personal computer.

The use of the communication controller of the present invention is not limited to standard wireline communication networks. The communication controller can be used in wireless communication networks, Hybrid Fiber/Coax communication networks and any other communication network that can be interconnected to other communication networks.

We claim:

1. A communication controller for routing information signals between a plurality of communication networks, at least two of the communication networks having different protocols, the communication controller comprising:

a QoS monitor module configured to receive monitor signals containing quality of service network characteristic measurement data where such monitor signals are either from network monitoring equipment or from received test signals transmitted by the QoS monitor module and where the QoS monitor is further configured to compile the quality of service network measurement characteristic data;

a User Interface module configured to receive user response signals from a user responding to a request message transmitted by the communication controller where such user response signals indicate whether the user has decided to reroute its information signals; and a Network Port coupled to the QoS monitor module and to the User Interface module where the Network Port is configured to receive signals and determine whether such signals are monitor signals, criteria signals, user response signals or information signals and where the Network Port is further configured to route received information signals to one of the networks with an acceptable QoS based on network characteristic measurement data contained in the received monitor signals, network and/or service provider criteria data contained in the received criteria signals and request messages contained in the received user response signals.

2. The communication controller of claim 1 where the Network Port routes information signals that are part of established communications substantially without any disruptions to the established communications.

3. The communication controller of claim 1 further comprising a User/System criteria module coupled to the Network Port where the User/System criteria module is configured to receive network criteria signal and store network criteria data contained in such network criteria signals transferred from the Network Port.

4. The communication controller of claim 3 further comprising:

a Reroute Processing module coupled to the Network Port and to the user interface module; and a Decision Processing module coupled to the Reroute Processing module, the User/System criteria module and the QoS monitor module where the Decision Processing module generates a decision message which is transferred to the Reroute Processing module causing the Reroute Processing module to generate control signals that are transferred to the Network Port causing the Network Port to route received information signals in accordance with the control signals.

5. The communication controller of claim 1 interfaced to a communication device.

6. The communication controller of claim 5 where the communication device is a personal computer or a mainframe computer.

7. The communication controller of claim 5 where the communication device is a gateway.

8. A method for routing information signals received by a communication controller from a plurality of communication networks, at least two of the communication networks having different protocols, the method comprising the steps of:

receiving monitor signals, which contain quality of service network characteristic measurement data, from the communication networks;

receiving network criteria signals, which contain criteria data, from the networks;

receiving user response signals in response to a request message transmitted by the controller;

generating a decision message based on the monitor signals and the network criteria signals;

generating control signals based on the decision message and a user response message; and routing the received information signals via one of the networks selected in accordance with the control signals.

9. The method of claim 8 where the step of receiving monitor signals further comprises the step of compiling the quality of service network characteristic measurement data.

10. The method of claim 8 where the user response message is generated based on the received user response signals.

* * * * *